United States Patent [19]
Feltman

[11] Patent Number: 5,135,298
[45] Date of Patent: Aug. 4, 1992

[54] SUNGLASS LENS

[76] Inventor: Francis L. Feltman, 115-C Northwood Way, Ketchum, Id. 83340

[21] Appl. No.: 581,544

[22] Filed: Sep. 12, 1990

[51] Int. Cl.$^5$ .......................... G02C 7/10; G02C 7/12
[52] U.S. Cl. ..................................... 351/163; 351/166
[58] Field of Search ............... 351/159, 163, 164, 165, 351/166

[56] References Cited

U.S. PATENT DOCUMENTS

| | | | |
|---|---|---|---|
| 3,208,860 | 9/1965 | Armistead et al. | 106/54 |
| 3,621,838 | 11/1971 | Harding et al. | 351/163 X |
| 4,261,656 | 4/1981 | Wu | 351/163 |
| 4,679,918 | 7/1987 | Ace | 351/163 |
| 4,902,081 | 2/1990 | Huffer | 350/166 X |
| 4,943,140 | 7/1990 | Woodard et al. | 350/164 |

Primary Examiner—Scott J. Sugarman
Attorney, Agent, or Firm—Frank J. Dykas; Craig M. Korfanta; Ken J. Pedersen

[57] ABSTRACT

A combination lens (10) for sunglasses is disclosed which uses a pair of superposed lenses (12 and 14) which are laminated together with a polarized light filtering film (26) in between said lenses. Polarized light filtering film (26) has had light absorbing dye and ultraviolet radiation inhibitors integrated into the film material. Front, or anterior lens (12) is a photochromic glass plate with a metallic light reflective coating (18) applied to the inner laminated surface (16) of anterior lens (12). Rear, or posterior lens (14) has an anti-reflective filter (22) applied to the outer non-laminated surface (24) of posterior lens (14).

6 Claims, 2 Drawing Sheets

SUNGLASS LENS

BACKGROUND OF THE INVENTION

1. Technical Field

This invention generally relates to eye protection glasses and more particularly, it relates to the lenses used in sunglasses.

2. Background Art

The spectrum of electromagnetic radiation from the sun which reaches the earth's surface ranges from 0.01 nanometers to over 1 million kilometers in wave length and includes infrared, visible light, ultra-violet light, x-rays, and gamma rays. The visible light range is generally defined as those wavelengths in the 400 to 700 nanometer range.

Visible light from the sun is scattered and reflected as it enters the atmosphere, oftentimes causing a dazzling brightness which can cause visual discomfort. When light strikes a flat surface, part of the light is reflected from this surface and part of the light is absorbed. The light that is reflected can produce a very harsh, bright, dazzling light which is commonly referred to as glare.

Electromagnetic radiation with wavelengths of approximately 800 to 1000 nanometers is part of the invisible infrared spectrum. This is the thermal wavelength which is responsible for the heat from the sun. This heat is also a discomfort to the eyes.

Wavelengths shorter than 400 nanometers fall below the visible light spectrum and represent the ultraviolet light spectrum. Excessive exposure of the eyes to ultraviolet can cause damage to the cornea and the lens of the eye. Most concern over possible damage to the eye involves the band of ultraviolet light known as UVB which are wavelengths from 290 to 315 nanometers. The longer wavelengths of ultraviolet light, from 315 nanometers to 380 nanometers, are called UVA. These wavelengths can also be detrimental, but much less so than UVB.

Part of the UVB, including all wavelengths shorter than 295 nanometers, are absorbed by the cornea, the transparent tissue that covers the colored iris and pupil of the eye. Although ultraviolet rays damage corneal cells, the cornea repairs itself so rapidly that it usually keeps up with the assault. However, prolonged ultraviolet exposure can overwhelm the cornea's repair processes causing temporary blindness. Even so the cornea will usually recover within a few days.

The chief concern about ultraviolet damage, centers on the lens of the eye. Lifetime exposure to ultraviolet contributes to some types of cataracts. The human eye is for all practical purposes, an ultraviolet filter. The lens of the eye absorbs all the UVA plus any UVB not blocked by the cornea. The lens thus shields the light sensitive retina at the back of the eye from the ultraviolet rays, but possibly places itself at risk in the process.

Efforts to reduce the discomfort of bright sunlight or the effects of glare such as wearing a hat or a visor with a wide brim to shade the eyes from the sun have been used for many years. What used to be known as shaded or smoked glasses have also been around for a long time. George Washington had a pair. These smoked glasses or sunglasses as they are more commonly called even pre-date prescription glasses although their popularity did not become evident until the early twentieth century. While these methods served to cut down on the amount of light reaching the eyes, they did little to reduce the glare from reflected surfaces and virtually nothing to reduce the ultraviolet light which reached the eyes.

Thus, sunglasses which were designed to give comfort and protection to the eyes were developed.

All sunglasses have lenses which are manufactured from glass or synthetic materials. These lenses may have the light absorbing dyes and ultraviolet inhibiting chemicals mixed into the lens materials or coated on the surface of the lens. Glass lenses are scratch resistant, non-warping and usually distortion free. Synthetic lenses are light, virtually shatterproof and generally less expensive.

The first polarizing sunglasses were developed by Edwin Land in 1936. When random non-polarized light from the sun reflects off of a flat surface the light waves become directional, or polarized, rather than random. Ordinary non-polarized light is a grouping of electromagnetic waves that can ripple in a variety of directions, polarized light waves are restricted to one plane. This causes a hot spot of intense glare. Glare is polarized light.

Polarized sunglasses filter out this glare by the use of a polarized light filtering film commonly made of polyvinyl alcohol dyed with iodine. This film is constructed so that its crystal molecules are aligned in parallel lines. When the polarized light impacts the polarizing film, only light waves which lie in the same vertical plane as the crystals in the polarizing film are allowed to pass through the membrane. The light which passes through this film is then made to pass through a second polarizing film that is at right angles to the first polarizing film. Thus, every possible path for the light is blocked and glare is eliminated.

One method to reduce bright light has been to add light absorbing dye to the lenses material as in the case of synthetic lenses which readily accept tinting mediums or to coat the surfaces of the lenses as is done with glass lenses which do not accept tinting mediums very easily. Differing amounts of this light absorbing dye is added to the lens material or coated on the surface producing a lighter or darker lens which effectively blocks out some of the visible light thus reducing or eliminating bright light. Some manufacturers utilize a tinting process which produces gradient or multi-gradient lenses. These lenses are darker at the top than at the bottom or they may be darker at the top and the bottom and lighter in the middle. In this manner the top filters are high to absorb bright light from the sun while the bottom filters are used to absorb direct glare and bright light from water or road surfaces. WOODARD, ET AL., U.S. Pat. No. 4,943,140, describes a windshield for automobiles which is made of laminated glass comprising thermal plastic inner layers sandwiched between two layers of glass. This inner layer has an integral marginal band of light absorbing dye above the driver's direct line of vision for the windshield to reduce sunlight glare. This band is graduated in intensity, being greatest near the upper peripheral of the inner layer when in place in a windshield and greatly diminishing into an almost imperceptible level at the lower edge of the band. However, as described this particular invention is for a windshield for an automobile.

A common feature on many sunglasses is a mirrored surface. Mirroring is accomplished by applying a thin coating of a transparent light reflective metal oxide coating to the lens which reflects some of the bright light and also reflects much of the heat created by the infrared rays. This feature also reflects some of the ultraviolet light.

HUFFER, U.S. Pat. No. 4,902,081, teaches a window for a building which uses two panes of glass in a juxtaposed relationship providing an air space in between. On the inside surface of the outer pane of glass, there are a plurality of metal coatings applied to absorb visible light and infrared radiation. However, this invention differs from the present invention in that it contains a space between the two glass plates. Also, the metal coatings on the inner surface of the outer glass pane serve to absorb rather than to reflect the visible light and infrared radiation.

A more recent development in sunglass technology is photochromic lenses, ARMISTEAD, et al. U.S. Pat. No. 3,208,860. Photochromic lenses have the ability to adjust their density in relation to the sun. These glass lenses have submicroscopic silver halide crystallites impregnated in the lens material. This silver halide ingredient darkens under the action of ultraviolet radiation to reduce the optical transmittance of the glass. When the source of ultraviolet radiation is removed, the silver halide crystallites return to their original color state, restoring the optical transmittance to its original level. In glass lenses, this sequence of darkening and fading can be repeated indefinitely without fatigue or loss of photochromic properties. However, attempts to introduce photochromic chemicals into synthetic lenses has been largely unsuccessful because the photochromic properties disappear in a relatively short time.

While these lenses may all be very useful and provide adequate eye protection for their individual and specific uses, what is needed is a lens for sunglasses that is strong and shatter resistant which cuts down on visible light, reduces glare, reflects heat and protects the eyes from harmful ultraviolet light waves.

It is therefor an object of this invention to provide a lens for sunglasses that satisfies these needs.

SUMMARY OF THE INVENTION

These and other objects are accomplished by a combination lens for sunglasses which is made with outer and inner, ground and polished, optically correct glass plates which are superimposed and laminated together with a polarized light filtering membrane between them. The outer glass plate is photochromic and has a curvature of a pre-determined radius. This photochromic plate also has a coating on its inner surface of a metallic, light reflective material. This metallic, light reflective material serves to reflect sunlight away from the eye. This reduces the amount of visible light and heat, caused by the infrared light, that reaches the eye.

The inner glass plate has a curvature of the same radius as the outer glass plate and has an anti-reflective filter vacuum heat applied to its outer non-laminated surface. This filter enhances available filtered light and diffuses bounce-back reflection.

The polarized light filtering membrane is composed of crystals which are aligned in vertical lines. This crystal configuration allows only light oriented in a particular direction to pass through the lens. This filter is used to reduce the glare from water, snow or other flat surfaces.

The glass plates are chemically treated for maximum shatter resistance. Also, the lamination process serves to strengthen the lens and improves the shatter resistance of the combination lens as a whole.

The above-mentioned features of this invention serve to provide visual comfort and to protect the eyes.

DESCRIPTION OF THE PREFERRED EMBODIMENTS

Figure 1:
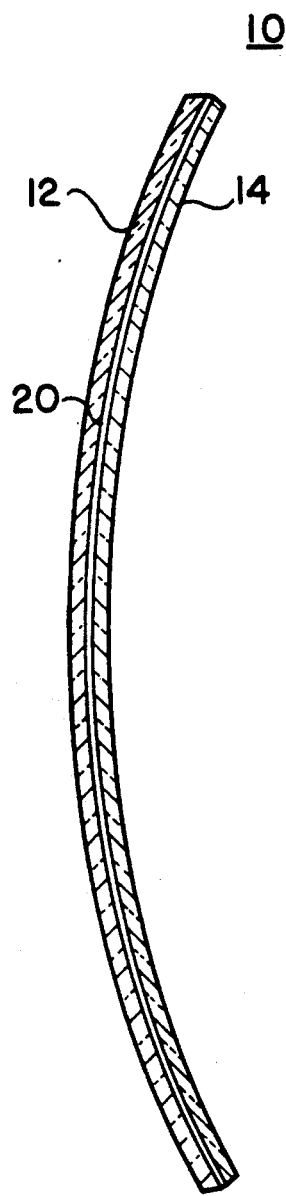
FIG. 1 is a cross-sectional side view of the improved sunglass lens.
Figure 2:
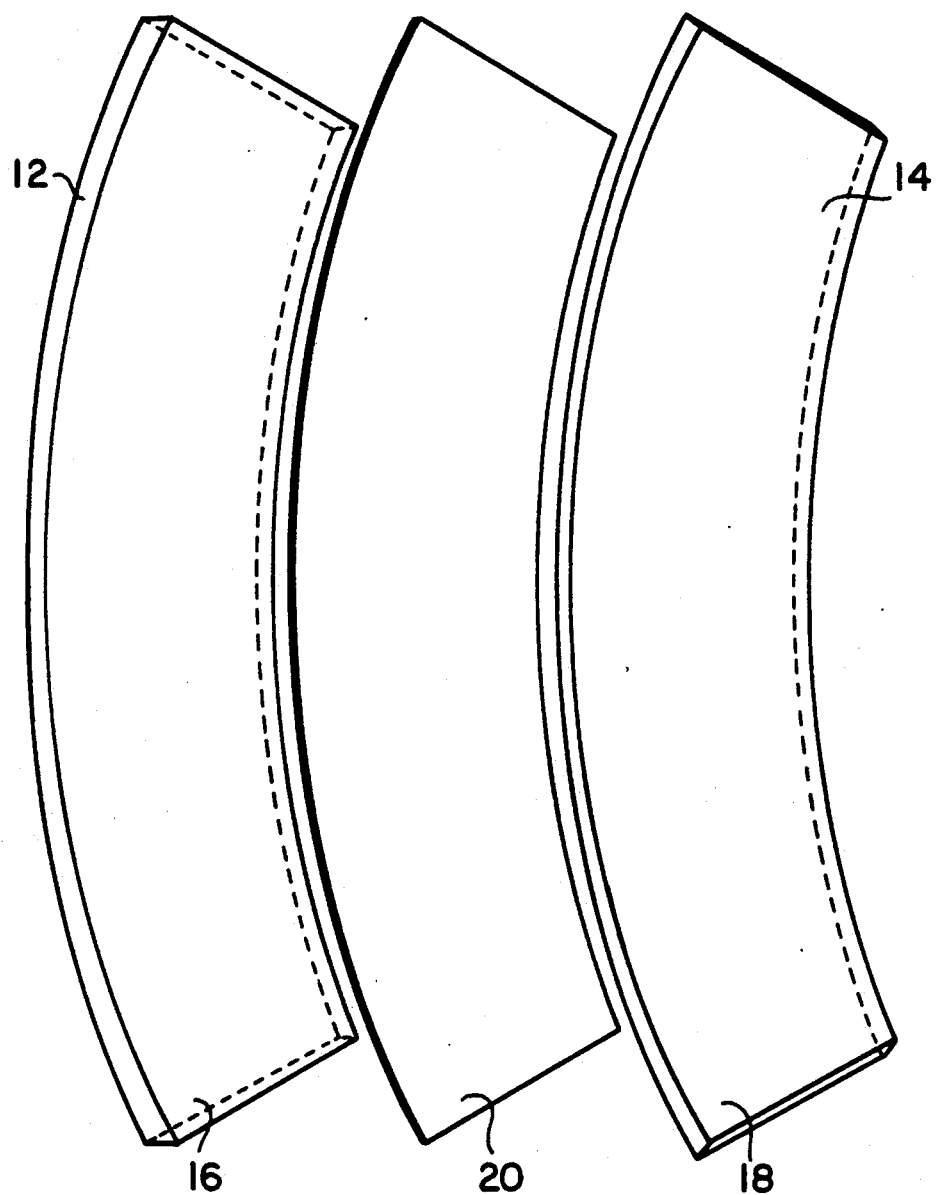
FIG. 2 is an exploded view of the improved sunglass lens.

An example of improved combination sunglass lens 10 is seen in FIGS. 1 and 2. This lens consists of a three-part assembly having a front, or anterior, lens 12, a central polarized light filtering film 20, and a posterior lens 14, all laminated together to form combination lens 10.

In addition, both posterior surfaces of anterior lens 12 and posterior lens 14, surfaces 16 and 18, are each coated with metallic light reflective coatings.

The front, anterior lens 12, is an optically correct, ground and polished photochromic lens and as such has a predetermined index of refraction. The photochromic properties of anterior lens 12 are accomplished by impregnating the glass of anterior lens 12 with silver halide crystals. The silver halide crystals react to ultraviolet rays and automatically adjust their density in relation to the brightness of the sun. In full sunlight, they darken; removed from sunlight, they fade. In the preferred embodiment, the photochromic properties can induce either gray or copper tinting to the lens.

Polarized light filtering film 20 is a thin synthetic membrane constructed with its crystal molecules aligned in parallel lines. There are a variety of such films available on the market, with one of the most common being formed of a polyvinyl alcohol dyed with iodine. The polarized light filtering film 20 eliminates glare and cuts surface reflection from flat surfaces such as water, snow or roads by permitting only light oriented in a particular direction to pass through the molecular crystal structure of film 20. This film, in the preferred embodiment, further is provided with a light absorbing dye added to the film material to reduce the optical transmittance of the lens and therefore filter bright lights. In the preferred embodiment, the dyes selected are specifically designed to reduce light transmittance in the blue light spectrum.

In the preferred embodiment, polarized light filtering film 20 is further doped with ultraviolet inhibitors in order to block most, if not all, of the ultraviolet light rays attempting to pass through the lens.

Posterior lens 14 is formed at the same curvature as anterior lens 12, and is also an optically correct, ground and polished lens.

There are two metallic light reflective coatings, provided in combination lens 10. These are found on the posterior surfaces of anterior lens 12 as coating 16, and on posterior lens 14 as coating 18. Each of these coatings, 16 and 18, are formed of a series of applications of magnesium fluoride applied by use of a heat, vacuum cure treatment process which is a process well known in the art. However, the positioning of the anterior reflective coatings with relationship to anterior and posterior lenses 12 and 14 is significant. First, metallic light reflective coating 16 reflects some visible and ultraviolet light away from the eyes, and perhaps more significantly, reflects infrared radiation which is perceived by the wearer as heat. The second metallic and light reflective coating 18, found on the posterior surface of posterior lens 14, diffuses bounce back reflection of light striking the inside surface of combination lens 10.

Since posterior lens 14 is not photochromic, it is possible to provide for various tintings to be formed integrally with the lens to provide a variety of effects for the wearer, for example, posterior lens 14 can be tinted red, or blue, or any other color thereby providing unique visual effects for anyone using combination lens 10.

As previously stated, anterior lens 12, polarizing film 20, and posterior lens 14, are all laminated together. The lamination is accomplished by means of standard epoxy type adhesives, a number of which are available commercially in the open market. In the preferred embodiment, care is taken to assure that the laminated adhesive is formed of a material having the same index of refraction as that of lenses 12 and 14. The lamination process itself provides additional benefits to the lens in that it enhances the shatter proof properties of the lens in a manner similar to that of conventional safety plate glass found in today's automobiles.

While there is shown and described the present preferred embodiment of the invention, it is to be distinctly understood that this invention is not limited thereto but may be variously embodied to practice within the scope of the following claims.

I claim:

1. A combination lens for sunglasses which comprises:

a ground and polished, photochromic anterior glass lens having an anterior side parallel to a posterior surface, a curvature of a predetermined radius, and a predetermined index of refraction, said photochromic anterior lens further having a coating on its posterior surface of a transparent metallic light reflective material configured to reflect a portion of any incident light back out of the anterior lens;

a polarized light filtering film laminated to the metallic light reflective material on the posterior surface of the anterior lens;

a ground and polished, posterior glass lens having an anterior side parallel to a posterior surface, a curvature of the same radius as the anterior lens, and a predetermined index of refraction identical to the anterior glass lens, said posterior glass lens being laminated to the other side of the polarized light filtering film, and further having a transparent metallic light reflective material coating applied to the posterior surface of said posterior lens, said coating being configured to transmit any incident light on the posterior surface of the posterior lens through the posterior lens and back out of the anterior lens and further to reflect a portion of any incident light on the anterior side of the posterior lens back out of the anterior lens; and means for laminating the polarized light filtering film between said glass anterior and posterior lenses with an adhesive formed of a material having the same index of refraction as that of the anterior and posterior lenses.

2. Combination lens of claim 1 wherein the lamination means is a clear adhesive having an index of refraction identical to that of said glass lenses.

3. Combination lens of claim 1 wherein the polarized light filtering membrane further includes ultraviolet inhibiting means.

4. Combination lens of claim 3 wherein the polarized light filtering membrane further includes a tinting medium for darkening the combination lens.

5. Lens of claim 1 wherein anterior lens is formed of grey colored photochromic glass.

6. Lens of claim 1 wherein anterior lens is formed of copper colored photochromic glass.

* * * * *